United States Patent Office 3,450,714
Patented June 17, 1969

---

3,450,714
N-DIALKYLAMINOALKYL-NAPHTHALENE-DICARBOXIMIDES
Eugene Wagner, Zionsville, Ind., assignor to The Dow Chemical Company, Midland, Mich., a corporation of Delaware
No Drawing. Filed May 15, 1967, Ser. No. 638,571
Int. Cl. C07d 27/52; A61k 27/00
U.S. Cl. 260—326
2 Claims

ABSTRACT OF THE DISCLOSURE

N-dialkylaminoalkyl - 1,4,5,8 - tetrahydro-4a,8a-naphthalenedicarboximides and their hydrohalide salts wherein the alkyl groups are methyl, ethyl or propyl, and a method for their preparation. The novel compounds are useful as anticonvulsants and as antimicrobial agents.

---

This invention is concerned with novel substituted-naphthalenedicarboximides and is particularly directed to N-dialkylaminoalkyl-1,4,5,8-tetrahydro-4a,8a-naphthalenedicarboximides corresponding to the formula:

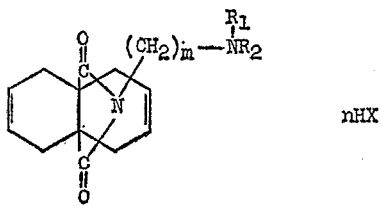

nHX

In the present specification and claims, $R_1$ and $R_2$ each independently represent methyl, ethyl or propyl, HX represents hydrochloride or hydrobromide, $m$ represents an integer from 1, to 2, to 3 and $n$ represents an integer from zero to one. The novel substituted-naphthalenedicarboximides are crystalline solids which are soluble in organic solvents such as methanol, ethanol, benzene and acetone and only slightly soluble in water. The hydrochloride and hydrobromide salts of the novel substituted-naphthalenedicarboximides are crystalline solids which are soluble in alcohols and water and only slightly soluble in ether. The new compounds have been found to be useful for administration to laboratory animals in ascertaining drug effects on the central and peripheral nervous system. They are particularly useful as anticonvulsants and have little or no activity in other pharmacological areas at dosages consistent with good anticonvulsant activity. The novel compounds are also useful as antimicrobial agents.

The novel substituted-naphthalenedicarboximides are prepared by the reaction of 1,4,5,8-tetrahydro-4a,8a-naphthalenedicarboxylic anhydride with a dialkylaminoalkylamine. The reaction proceeds when the reactants are contacted and mixed and proceeds at temperatures from about 140° to 220° C., and preferably at about 190° to 210° C. In the preferred procedure, the reactants are initially mixed together in an inert organic solvent such as ether. A solid precipitates from the mixture. The precipitate is separated from the solvent by conventional methods such as decantation and evaporation, and thereafter heated to a temperature from 190° to 210° C. for about 5 to 15 minutes. The substituted-naphthalenedicarboximide product can be separated and purified by conventional methods such as recrystallization. In the preferred procedure, the substituted-naphthalenedicarboximide product is separated by converting it to a hydrochloride or hydrobromide salt. The salt is then purified by conventional procedures such as recrystallization and washing.

The hydrochloride and hydrobromide salts of the substituted-naphthalenedicarboximides of the invention can be prepared by dissolving the substituted-naphthalenedicarboximide compound in ethanol or methanol, adding ethereal hydrogen bromide or ethereal hydrogen chloride until separation of the hydrohalide product as an insoluble material is complete and separating the hydrohalide by such conventional methods as filtration. The hydrohalide salt can be purified by conventional methods such as recrystallization.

The free base form of the substituted-naphthalenedicarboximides can be prepared from the hydrohalide salts by dissolving the hydrohalide salt in a minimum amount of water and making the solution basic by the addition of aqueous sodium hydroxide. The substituted-naphthalenedicarboximide compound, in the free base form, separates as a water-insoluble organic layer and can be separated from the aqueous sodium hydroxide by conventional methods such as decantation. The substituted-naphthalenedicarboximide product can be further purified by recrystallization.

In preparing the substituted-naphthalenedicarboximides of the invention, 1,4,5,8-tetrahydro-4a,8a-naphthalenedicarboxylic anhydride is dissolved in ether and added to an ether solution of a dialkylaminoalkylamine. The exact proportions of the reactants to be employed are not critical, some of the desired product being obtained when the reactants are combined in any proportions. However, the reaction consumes the reactants in equimolar proportions and the use of an excess of the dialkylaminoalkylamine is preferred. A precipitate forms when the reactants are mixed and the precipitate is conveniently separated by decantation followed by evaporation in vacuo to remove the ether solvent. The residue is heated to a temperature within the reaction temperature range, cooled and dissolved in ethanol. In a convenient procedure, the product is converted to its hydrochloride salt by the addition of ethereal hydrogen chloride to precipitate the hydrochloride salt of the substituted-naphthalenedicarboximide product. The hydrochloride salt is then purified by conventional procedures such as recrystallization. When it is desired to obtain the purified substituted-naphthalenedicarboximide in the free base form, the hydrochloride salt is conveniently dissolved in a minimal amount of water and aqueous sodium hydroxide is added until an oil layer separates in the mixture. The oil layer can then be separated by conventional procedures such as decantation and crystallized by trituration with organic solvents to produce the substituted-naphthalenedicarboximide product in the free base form.

The following examples illustrate the invention but are not to be construed as limiting the same.

Example 1

Ten grams of 1,4,5,8-tetrahydro-4a,8a-naphthalenedicarboxylic anhydride were dissolved in 500 milliliters of ether and a solution of 5 milliliters of 3-dimethylaminopropylamine in 50 milliliters of ether was added dropwise to the resulting solution. A yellow material separated in the mixture. The mixture was cooled in an ice bath, the ether was decanted and the yellow material was evaporated in vacuo. The evaporation residue was heated to 150° C. in an oil bath until bubbling ceased. The mixture was then cooled and dissolved in 25 milliliters of ethanol. One hundred milliliters of ethereal hydrogen chloride were added to the solution and an oil layer separated. The oil was induced to crystallize by scratching. The resulting crystalline solid was separated by filtration, dissolved in methanol and precipitated by the addition of excess ether. The precipitate was dissolved in chloroform, the chloroform solution was filtered and the filtrate was evaporated in vacuo. The evaporation residue was dissolved in 5 milliliters of water and mixed with a slight excess of aqueous 20 percent sodium hydroxide. An oil layer separated from the mixture. The oil layer crystallized on standing and was recrystallized from a mixture of ethanol and water. The N-(3-dimethylaminopropyl)-1,4,5,8 - tetrahydro - 4a,8a - naphthalenedicarboximide product was found to melt at 71°–72° C. and to have carbon, hydrogen and nitrogen contents of 70..75, 8.30 and 9.51 percent, respectively, as compared with the theoretical contents of 70.80, 8.39 and 9.71 percent, respectively, calculated for the named structure. The structure of the named product was confirmed by infrared spectroscopy and nuclear magnetic resonance analysis.

In substantially the same procedure, using similar solvents, the following substituted-naphthalenedicarboximides of the invention are prepared.

N - (3 - diethylamino)propyl - 1,4,5,8 - tetrahydro - 4a,8a-naphthalenedicarboximide, having a molecular weight of 316.4, is prepared by mixing 1,4,5,8-tetrahydro-4a,8a-naphthalenedicarboxylic anhydride with 3-diethylaminopropylamine, heating the resulting precipitate and purifying the product in the form of its hydrochloride salt.

N - (2 - dithylamino)ethyl - 1,4,5,8 - tetrahydro - 4a,8a-naphthalenedicarboximide, having a molecular weight of 302.4, is prepared by mixing together 1,4,5,8-tetrahydro-4a,8a-naphthalenedicarboxylic anhydride and an excess of 2-diethylaminoethylamine, heating the resulting precipitate and purifying the product in the form of its hydrochloride salt.

N - (2 - dipropylamino)ethyl - 1,4,5,8 - tetrahydro - 4a,8a-naphthalenedicarboximide, having a molecular weight of 330.4, is prepared by mixing together 1,4,5,8-tetrahydro-4a,8a-naphthalenedicarboxylic anhydride and an excess of 2-dipropylaminoethylamine, heating the resulting precipitate and purifying the product in the form of its hydrochloride salt.

N - (2 - diethylamino)methyl - 1,4,5,8 - tetrahydro - 4a,8a-naphthalenedicarboximide, having a molecular weight of 288.4, is prepared by mixing together 1,4,5,8-tetrahydro-4a,8a-naphthalenedicarboxylic anhydride and an excess of 2-diethylaminomethylamine, heating the resulting precipitate and purifying the product in the form of its hydrochloride salt.

Example 2

Central nervous system activity of the substituted-naphthalenedicarboximide compounds was indicated by their effectiveness in blocking the pharmacological effects of oxotremorine [1-(2-oxopyrrolidino)-4-pyrrolidino-2-butyne]. The administration of 200 milligrams per kilogram of oxotremorine tomice by intraperitoneal injection produces salivation, defecation and tremors in the mice. In representative operations, the dosage of N-(3-dimethylamino)propyl - 1,4,5,8 - tetrahydro-4a,8a-naphthalenedicarboximide which was found to be effective in blocking the pharmacological effects of oxotremorine in 50 percent of the mice tested (ED 50) was found to be 27.8 milligrams per kilogram of the named compound administered by intraperitoneal injection.

Example 3

The compounds of the invention can also be employed as antimicrobial agents. In representative operations, N-(3 - dimethylamino)propyl - 1,4,5,8 - tetrahydro - 4a,8a-naphthalenedicarboximide was mixed with separate bacterial and fungal culture media in an amount sufficient to provide the test compound at a concentration of 500 parts per million as the sole toxicant therein. The separate culture media thus prepared were poured into petri dishes and allowed to harden. Separate culture media containing no substituted-naphthalenedicarboximide compound were poured into other petri dishes to serve as a check. The surface of the culture media in separate petri dishes was inoculated with one of the organisms *Staphylococcus aureus*, *Candida albicans* and typhoid fever bacteria. The dishes were incubated and observed periodically for the presence or absence of bacterial or fungal growth. The petri dishes containing N-(3-dimethylamino)propyl - 1,4,5,8 - tetrahydro - 4a,8a - naphthalenedicarboximide were found to have no bacterial or fungal frowth, while the check dishes supported luxurient colonies of the above-named organisms.

I claim:
1. A substituted 1,4,5,8-tetrahydro-4a,8a-naphthalenedicarboximide corresponding to the formula

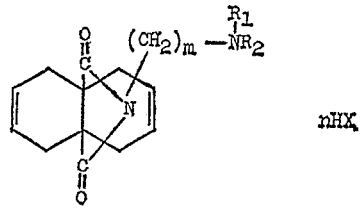

wherein $R_1$ and $R_2$ each indepedently represent a member of the group consisting of methyl, ethyl and propyl, HX represents a member of the group consisting of hydrochloride and hydrobromide, $m$ represents an integer from 1 to 3, inclusive, and $n$ represents an integer from 0 to 1.

2. N - (3 - dimethylamino)propyl-1,4,5,8 - tetrahydro-4a,8a-naphthalenedicarboximide.

References Cited

Haworth et al.: J. Chem. Soc. (London), 1962, 2720–30.

ALEX MAZEL, *Primary Examiner.*

J. A. NARGAVAGE, *Assistant Examiner.*

U.S. Cl. X.R.

424—274.